United States Patent Office 3,067,111
Patented Dec. 4, 1962

3,067,111
PRODUCTION OF NITROGEN TRIFLUORIDE
Martin Schmeisser and Friedo Huber, Aachen, Germany;
said Huber assignor to said Schmeisser
No Drawing. Filed Dec. 4, 1958, Ser. No. 778,060
Claims priority, application Germany Dec. 16, 1957
3 Claims. (Cl. 204—59)

The present invention relates to an improved and convenient process of producing nitrogen trifluoride.

Nitrogen trifluoride, $NF_3$, was produced by O. Ruff, J. Fischer and F. Luft, Z. anorg. allg. Chem. 172, 417 (1928), by electrolysis of $NH_4F$ in anhydrous hydrogen fluoride. However, this process produces only very small yields; besides, it is not always reproducible and is accompanied with puffs and explosions.

A more advantageous process of producing nitrogen trifluoride is the electrolysis of pyridine in anhydrous hydrogen fluoride, wherein $NF_3$ is formed as by-product (this process is described by J. H. Simons, J. Electrochem. Soc. 95, 47 (1949), and in U.S. Letters Patent No. 2,519,983). However, this process is not suitable in the production of $NF_3$, insofar as large amounts of $CF_4$ are simultaneously formed as another by-product and, because of the substantially similar physical and chemical properties (B.P. $NF_3$ —129° C., B.P. $CF_4$ —128° C.), it is possible only with great difficulty to separate $CF_4$ from $NF_3$.

It is the principal object of the present invention to do away with the aforesaid disadvantages and to provide a novel and economic process of producing nitrogen trifluoride in high purity and good yield.

Further objects will become apparent as the following description proceeds.

In accordance with the present invention it has been found that nitrogen trifluoride is produced by electrolysis of a solution of urea in anhydrous hydrogen fluoride.

The new process produces $NF_3$ in high purity and good yield while avoiding the disadvantage associated with the aforesaid prior art processes. The process of the invention is preferably carried out at a voltage of about 6 volts using a current of about 20 amperes or about 30 amperes per square decimeter. Besides slight amounts of $CF_4$ and $OF_2$ as well as of high molecular weight compounds containing C and F, the new process produces appreciable quantities of $N_2$, $COF_2$ and $CO_2$ as by-products which can easily be separated from the $NF_3$ which is obtained in large quantities. About 50 percent of the nitrogen present in the starting material is obtained in form of $NF_3$.

Nitrogen trifluoride can be used as a dielectric as well as a compound yielding fluorine under appropriate conditions.

The invention is further illustrated by the following example without being restricted thereto.

Example 200 grams of urea are dissolved at —10° C. in about 2 litres of anhydrous hydrogen fluoride to give a solution of $CO(NH_2)_2 \cdot 2HF$. The solution is electrolyzed at the same temperature (—10° C.) while applying a voltage of 6 volts and a current of about 20 amperes. The resulting volatile reaction products are passed through tubes containing solid potassium fluoride in order to remove any entrained hydrogen fluoride, and then washed with aqueous alkaline $Na_2S_2O_3$-solution in order to remove $COF_2$, $CO_2$, and $OF_2$. Any entrained water vapor (originating from the $Na_2S_2O_3$ solution) is retained by being passed through a trap cooled to a temperature of —78° C. The crude product obtained is fractionated in high vacuum between —183° and 196° C., distilled and thereby liberated from all the aforesaid impurities (except ~1 percent $CF_4$).

We claim:
1. Process for the production of nitrogen trifluoride, which comprises electrolyzing a current-conducting solution of urea in anhydrous hydrogen fluoride at a temperature and pressure at which a liquid state is maintained and at a cell voltage sufficient to cause the production of nitrogen trifluoride at a useful rate, and recovering the nitrogen trifluoride formed.

2. Process according to claim 1, in which the electrolyzing is effected at a temperature of about —10° C. and a voltage of about 6 volts and a current of about 30 amperes per square decimeter.

3. Process according to claim 1, in which the electrolyzing is effected at a temperature of about —10° C. and a voltage of about 6 volts and a current of about 20 amperes per square decimeter.

References Cited in the file of this patent
UNITED STATES PATENTS
2,519,983    Simons _____ Aug. 22, 1950

OTHER REFERENCES
Simons et al.: Journal Electrochemical Society, vol. 95 (February 1949), pages 47–67.